United States Patent [19]

Pallakoff et al.

[11] Patent Number: 5,651,096
[45] Date of Patent: Jul. 22, 1997

[54] MERGING OF LANGUAGE MODELS FROM TWO OR MORE APPLICATION PROGRAMS FOR A SPEECH RECOGNITION SYSTEM

[75] Inventors: Matthew G. Pallakoff, Mountain View; Kurt W. Rodarmer, Sunnyvale; Arthur Arlo Reeves, Santa Cruz, all of Calif.

[73] Assignee: Apple Computer, Inc., Cupertino, Calif.

[21] Appl. No.: 403,594

[22] Filed: Mar. 14, 1995

[51] Int. Cl.$^6$ .................................................. G10L 5/06
[52] U.S. Cl. .......................... 395/2.84; 395/2.52; 395/2.6
[58] Field of Search .................................. 395/2.81, 2.82, 395/2.84, 2.52, 2.6

[56] References Cited

PUBLICATIONS

Apple Plain Talk Software Kit User's Guide, Apple Computer, Inc. Copyright 1994.
Speech Recognition API Programmer's Reference, Windows 3.1 Edition rev. .05beta, Sep. 30, 1994.
Speech API SDK, Microsoft Speeach API, Version 1.0, Windows (TM) 95, Microsoft Corporation.

*Primary Examiner*—Allen R. MacDonald
*Assistant Examiner*—Tálivaldis Ivars Šmits
*Attorney, Agent, or Firm*—Mark A. Aaker

[57] ABSTRACT

A speech recognition system operating on a computer system, which uses a single speech recognizer for all of the currently running application programs and provides a way of efficiently determining the proper destination application program for recognized speech. The speech recognizer uses a language model formed from the merging of the language models from two or more application programs. The merged language model includes data values indicating which application program's language model was the source of the language model elements so that when those elements are recognized, recognition results can be directed to that application program.

3 Claims, 2 Drawing Sheets

MERGING OF LANGUAGE MODELS FROM TWO OR MORE APPLICATION PROGRAMS FOR A SPEECH RECOGNITION SYSTEM

FIELD OF THE INVENTION

This invention relates to a speech recognition system operating on a computer system.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Researchers have attempted to increase the utility of computer systems by having them recognize speech. Current computer systems can run several application programs simultaneously and it is the expectation of the computer user that the computer system will have one microphone or sound input, but that speech recognition will be available for all of the currently running application programs.

One approach to provide speech recognition for all of the currently running application programs is to distribute the single sound input stream from the microphone to multiple speech recognizers, one speech recognizer for each application program. This requires some sort of distribution method, or the ability to rapidly cycle through all the speech recognizers as speech is arriving. Another problem is the large processing load which multiple speech recognizers will impose on a single computer system. Speech recognition has proven to be a computation intensive operation, especially for large vocabulary, continuous-speech, speaker-independent speech recognition. For these reasons, running multiple speech recognizers is difficult and undesirable.

Another approach to provide speech recognition for all of the currently running application programs is for the computer system to use a single speech recognizer for all the application programs. This approach has problems in determining how to have a single speech recognizer recognize words for all of the application programs, and how to direct a piece of recognized speech to the proper application program. This invention provides a way of efficiently determining the proper destination application program for recognized speech from a single speech recognizer operating for all application programs.

SUMMARY OF THE INVENTION

This invention relates to a speech recognition system operating on a computer system, which uses a single speech recognizer for all of the currently running application programs and provides a way of efficiently determining the proper destination application program for recognized speech. The speech recognizer uses a language model formed from the merging of the language models from two or more application programs. The merged language model includes data values indicating which application program's language model was the source of the language model elements so that when those elements are recognized, recognition results can be directed to that application program.

This invention allows a computer system to operate with a single sound input source, and to use a single speech recognizer rather than multiple speech recognizers. These and other features of the invention will be apparent to a person skilled in the art from the following drawings, description and claims.

DETAILED DESCRIPTION

Figure 1:
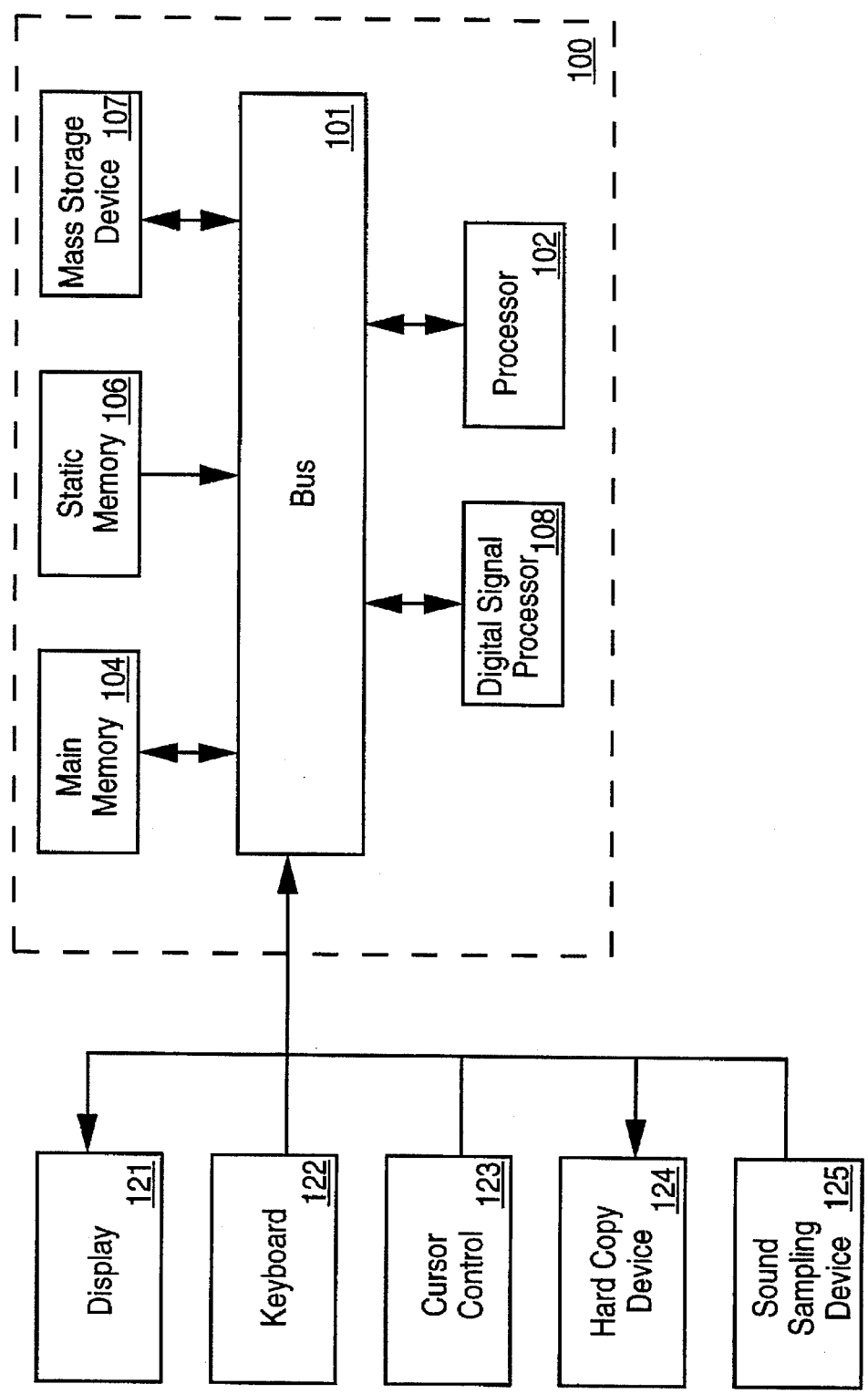
FIG. 1 shows a block diagram of a computer system equipped for speech recognition, upon which the present invention can be implemented.

FIG. 1 shows a block diagram of a computer system equipped for speech recognition, upon which the present invention can be implemented. The computer system is composed of a computer 100 having a communication bus 101 which connects a processor 102 with memory and storage devices. A main memory 104, such as RAM, and a static memory 106, such as ROM, can be used to hold data needed to operate the computer. A mass storage device 107, such as a hard disk, provides a large volume storage area for long term storage of data. When equipped for speech recognition, the computer 100 may also include specialized components such as a digital signal processor 108, which can rapidly process audio and speech signals. With sufficient processing power in processor 102, a digital signal processor 108 may be unnecessary. The computer 100 will also be connected to various external or peripheral devices such as a display 121, keyboard 122, cursor control 123 such as a mouse, and hard copy device 124 such as a printer. When equipped for speech recognition, the computer 100 can be connected to a sound sampling device 125 such as a microphone or other audio input/output interface.

Figure 2:
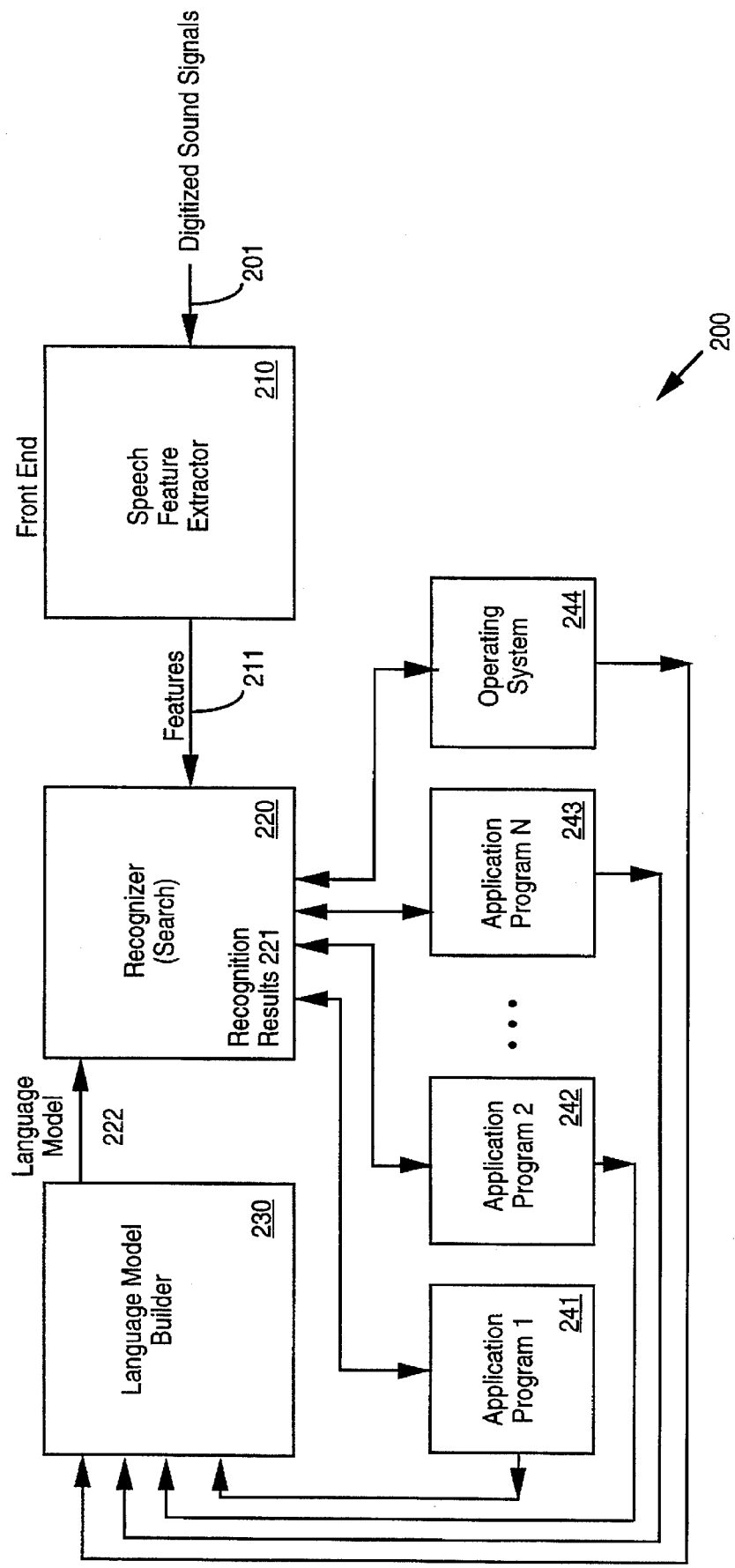
FIG. 2 shows a block diagram of the functional components of a speech recognition system upon which the present invention can be implemented.

FIG. 2 shows a block diagram of the functional components of a speech recognition system upon which the present invention can be implemented. As an example, this system is designed to perform real-time, continuous-speech, speaker-independent speech recognition for multiple application programs on a personal-computer class of computer system.

The speech recognition system 200 receives a stream of digitized sound signals 201, such as processed signals from a sound sampling device 125 of FIG. 1. The digitized sound signals 201 are processed by a speech feature extractor 210, also known as a "front end", to generate speech features 211. These functions can sometimes be optimally performed by processing steps on a specialized device such as digital signal processor 108 of FIG. 1. Due to their large computation load, it is desirable that only one such "front end" need be running on a computer system, even though speech recognition is to be made available to multiple application programs and to the operating system of the computer. For the purposes of this description, the operating system can be treated as another application program using the speech recognition system.

The speech features 211 are input to a speech recognizer 220 which also receives a language model 222 from a language model builder 230. The recognizer 220 functions primarily as a search engine which looks for matches of the speech features 211 to the language model 222. The recognizer 220 returns recognition results 221 to the application programs. It is desirable to run only one such recognizer on a computer system, even though speech recognition is available to multiple application programs.

The use of a language model is a known approach to provide more rapid and accurate speech recognition. The advantage of a language model has been to limit the number of words and phrases that can be recognized at a particular time. This set of words and phrases which can be recognized is called a language model. The language model can be revised or changed as the computer user interacts with the computer. An example of a speech recognition system using a language model and changing the language model as interaction with the computer proceeds is U.S. Pat. No. 5,384,892 "Dynamic Language Model For Speech Recognition" by inventor Robert D. Strong and assigned to Apple Computer, Inc.

In the invention of this patent application, the language model 222 is generated by the interaction of the language model builder 230 with the current application programs and the operating system, indicated in FIG. 2 as elements 241 through 244. In a preferred form in accordance with this invention, the language model 222 generated is a structured language model with attached data values. The language model 222 is formed from the merging of the language models from the two or more application programs. Since each application program has words to be recognized, each application program has its own language model. When these language models are merged to form the merged language model 222 for the recognizer, data values are added indicating the source of each element of the merged language model.

When this merged language model 222 is used by the recognizer 220 to recognize speech, the data values are used to determine the source of the recognized elements, and therefore to determine the proper destination application program for the return of recognition results. By use of the data values, the recognition results 221 are returned to the proper destination application program.

The recognition results are preferably a structured form of the language model 222 which has been pruned or reduced to only include elements corresponding to the recognized speech. See our copending patent application entitled "A Speech Recognition System Which Returns Recognition Results as a Reconstructed Language Model with Attached Data Values", having the same inventors and filed the same day herewith, for information on how such structured recognition results can be advantageously used in a speech recognition system.

The functions of the recognizer 220, language model builder 230, application programs 241, 242, 243 and operating system 244 can be implemented as data processing steps on the processor 102 of computer 100 of FIG. 1. Data elements such as the features 211, language model 222 and recognition results 221 can be stored in main memory 104 or mass storage device 107 and passed along bus 101 to the processor 102.

In operation, when the computer user speaks a phrase represented in the language model 222, the recognizer 220 recognizes the phrase, and uses the data values in the merged language model 222 to determine which application program contributed the phrase to the language model 222, and thereby, where to send the recognition results 221. The application program receiving the recognition results 221 interprets the recognition results 211 and performs an appropriate next action or response.

For example, suppose a first application program wished to recognize phrases like:

"call Matt"

"call Kurt"

"call Arlo"

In accordance with this invention, the first application program would create a structured language model such as Language Model 1.

Language Model 1:

<Model 1>=call <name>;

<name>=Matt|Kurt|Arlo;

The conventions used here are that, a phrase in brackets, such as "<Model 1>" identifies a language model element which can be built of other phrases or language model elements. The equal sign "=" indicates that the alternatives to build a language model element will follow in a list which includes alternatives separated by the vertical bar "|". Therefore, in Language Model 1, the <Model 1> element can consist of the word "call" followed by a <name> element. A <name> elements can be one of the words "Matt", "Kurt" or "Arlo" In a preferred implementation, object-oriented programming principles are used to implement language model elements in order to allow inheritance of characteristics and other advantages. Other language model structures and notations are possible, but this example will suffice to describe the present invention.

Suppose a second application program wished to recognize phrases like:

"open status report"

"open April budget"

In accordance with this invention, the second application program would create a structured language model such as Language Model 2.

Language Model 2:

<Model 2>=open <file>;

<file>=status report|April budget;

This invention would combine these language models into one larger Language Model 3.

Language Model 3::

<Model 3>=<Model 1>(D1)|<Model 2>(D2);

<Model 1>=call <name>;

<Model 2>=open <file>;

<name>=Matt|Kurt I Arlo;

<file>=status report|April budget;

Note that in Language Model 3, data values D1 and D2 have been attached in a manner which corresponds with Language Model 1 and Language Model 2. That is, by evaluating the attached data values, you can determine whether an element in Language Model 3 originally came from Language Model 1 or Language Model 2. D1 and D2 are data that identify the application program corresponding to each of the sub-language-models, <Model 1> and <Model 2>, that were added to <Model 3>. Of course, additional labeling with additional data values can be done, but this minimal labeling is sufficient to allow the determination of the source of a language model element.

When the user speaks an utterance like "call Kurt", the speech recognizer can identify that phrase came from Model 1, which contains the "call <name>" sub-language-model, and then can use the associated datum D1 to identify which application program contributed that language model element, in this case the first application program had contributed Language Model 1. That application program would be sent the recognition result, because it was the application program that is listening for such phrases. The other application program is listening for a different set of phrases, e.g. "open <file>". Therefore, the recognized speech is directed to the proper destination application program.

An Apple Computer document entitled "Using Apple's Speech Recognition Toolbox" explains a software programming interface to an implementation of a speech recognition system in accordance with this invention, to one skilled in the art to understand further details of an implementation of the invention. Other embodiments and variations of the invention will be apparent to one skilled in the art from a consideration of this specification, and it is intended that the scope of the invention be limited only by the allowable legal scope of the following claims.

We claim:

1. A method of speech recognition for a speech recognition system operating on a computer system, comprising the steps of:

the speech recognition system generating a merged language model from first and second language models corresponding to first and second application programs, and including a data value for an element of the merged language model indicating that the element came from one of the first and second language models;

the speech recognition system using the merged language model to identify elements which match a speech signal received at the speech recognition system;

the speech recognition system, for each identified element, using the included data value to determine from which of the first and second language models the identified element came; and the speech recognition system directing a recognition result to the application program corresponding to that language model.

2. A method of speech recognition for a speech recognition system operating on a computer system, comprising the steps of:

a first application program running on the computer system creating a first language model of elements to be recognized for the first application program;

a second application program running on the computer system creating a second language model of elements to be recognized for the second application program;

the speech recognition system merging the first language model and second language model into a merged language model, including for an element of the merged language model a data value indicating which of the first language model and second language model provided the element;

the speech recognition system receiving speech signals;

the speech recognition system searching the merged language model to identify elements which match the speech signals;

and for each identified element, using the data value to identify which of the first language model and second language model provided the element;

and directing a recognition result to one of the first application program and second application program corresponding to the identified one of the first language model and second language model which provided the element.

3. A speech recognition system operating on a computer system, comprising:

a merged language model created from first and second language models corresponding to first and second application programs, the merged language model including for an element of the merged language model a data value which indicates that the element came from one of the first and second language models;

a speech recognizer for receiving a speech signal and using the merged language model to identify elements of the merged language model which match the speech signal, and for each identified element using the data value to determine from which of the first and second language models the identified element came; and the speech recognizer further adapted for generating a recognition result and directing the recognition result to the application program corresponding to the determined language model.

* * * * *